United States Patent [19]

Benson et al.

[11] Patent Number: 5,107,649
[45] Date of Patent: Apr. 28, 1992

[54] COMPACT VACUUM INSULATION EMBODIMENTS

[75] Inventors: David K. Benson, Golden; Thomas F. Potter, Denver, both of Colo.

[73] Assignee: Midwest Research Institute, Kansas City, Mo.

[21] Appl. No.: 473,641

[22] Filed: Feb. 1, 1990

Related U.S. Application Data

[62] Division of Ser. No. 181,926, Apr. 15, 1988.

[51] Int. Cl.$^5$ .............................................. E04C 2/34
[52] U.S. Cl. ................................. 52/309.4; 52/309.7; 52/406; 52/791; 52/809; 428/69; 428/71
[58] Field of Search ............... 52/809, 808, 807, 577, 52/576, 404, 791, 406, 309.9, 309.4, 309.7; 428/69

[56] References Cited

U.S. PATENT DOCUMENTS

| | | | |
|---|---|---|---|
| 1,239,770 | 9/1917 | Coleman | 52/576 |
| 2,233,190 | 2/1941 | Amorosi | 52/576 |
| 2,989,156 | 6/1961 | Brooks et al. | |
| 3,151,365 | 10/1964 | Glaser et al. | |
| 3,151,712 | 10/1964 | Jackson | 52/792 |
| 3,179,549 | 4/1965 | Strong et al. | |
| 4,270,329 | 6/1981 | Moore | 52/576 |
| 4,444,821 | 4/1984 | Young et al. | |
| 4,468,423 | 8/1984 | Hall | |
| 4,486,482 | 12/1984 | Kobayashi et al. | |
| 4,683,154 | 7/1987 | Benson et al. | |

OTHER PUBLICATIONS

Untitled, undated report by ERNO Space Technology GmbH, "Development and Testing of Vacuum Super Insulation for Use in Residential and Industrial Construction", by Kurt Reinhard of ERNO Space Technology GmbH, Bremen, West Germany, Mar. 1977.

Primary Examiner—John E. Murtagh
Attorney, Agent, or Firm—Ken Richardson

[57] ABSTRACT

An ultra-thin compact vacuum insulation panel is comprised of two hard, but bendable metal wall sheets closely spaced apart from each other and welded around the edges to enclose a vacuum chamber. Glass or ceramic spacers hold the wall sheets apart. The spacers can be discrete spherical beads or monolithic sheets of glass or ceramic webs with nodules protruding therefrom to form essentially "point" or "line" contacts with the metal wall sheets. In the case of monolithic spacers that form "line" contacts, two such spacers with the line contacts running perpendicular to each other form effectively "point" contacts at the intersections. Corrugations accommodate bending and expansion, tubular insulated pipes and conduits, and preferred applications are also included.

4 Claims, 9 Drawing Sheets

COMPACT VACUUM INSULATION EMBODIMENTS

The U.S. Government has rights in this invention under Contract No. DE-AC02-83CH10093 between the U.S. Department of Energy and the Solar Energy Research Institute, a Division of Midwest Research Institute.

CROSS REFERENCE TO RELATED APPLICATION

This patent application is a divisional application of U.S. patent application, Ser. No. 181,926, filed Apr. 15, 1988, entitled Compact Vacuum Insulation.

BACKGROUND OF THE INVENTION

1. Field of the Invention

The present invention is generally related to insulation panels, and more specifically to vacuum insulation panels that have a high degree of resistance to heat transfer and are thin and bendable to form curved insulation panels, applications of such panels, and methods of making same.

2. Description of the Prior Art

There is nothing new about insulation or in the use of vacuum panels for insulation. There is, however, a rapidly emerging need for much improved insulation in terms of a combination of better insulation effectiveness, lighter weight, thinner, more durable, and more bendable or formable insulation products. The needs for such better insulation products emanate from such diverse areas as space-related vehicles and equipment, extremely low-temperature cryogenic vessels and pipes in scientific and industrial applications, and even common household appliances. For example, space vehicles and equipment to be launched into space need a very high quality of insulation to protect humans and equipment, yet there is no room for typically bulky insulated walls and panels.

State-of-the-art insulation for cryogenic applications is complex and expensive and still has significant shortcomings. For example, an insulation structure known as "cryopumped insulation" is often used for insulating cryogenic vessels and pipes. Such cryopumped insulation comprises many laminated layers of impervious material sealed at the edges and positioned adjacent the cryogenic material; e.g., liquid nitrogen. The liquid nitrogen is so cold that it causes the air in adjacent sealed spaces between the laminated sheets to liquify, thus leaving a partial vacuum in the spaces. This air-liquifying phenomenon occurs through adjacent layers a sufficient depth into the laminated insulation structure such that heat transfer is inhibited by the adjacent vacuum layers created or "cryopumped" in the insulation structures.

While such "cryopumped" insulation works quite well at the extremely low temperatures of cryogenic materials, like liquid nitrogen, which are cold enough to liquify air, it does not insulate at all in normal temperature ranges. Also, such "cryopumped" insulation is relatively thick and bulky, typically requiring several inches of thickness to be effective, and it is expensive and difficult to form into desired shapes or contours. Yet, prior to this invention, there were no thin, non-bulky, formable, yet equally effective alternatives.

On the domestic scene, both consumers and governments are demanding that manufacturers of home appliances, such as refrigerators, water heaters dishwashers, washing machines, clothes dryers, and the like, make these appliances much more energy efficient. For example, the California Energy Commission has mandated a 50% reduction in the energy use of refrigerator/freezers to be sold in that state in 1992. That mandated reduction in energy usage, while maintaining current dimensions, is not achievable without significant improvement in side-wall thermal efficiencies. Current technology could accommodate the reduction in heat transfer through the side walls of appliances by making insulated wall panels three times as thick. However, people do not want refrigerators with walls a foot thick. Architectural designs of homes and apartments, door widths, and the like practically prohibit increasing external dimensions of home appliances, and decreasing useable interior space will meet with much consumer dissatisfaction and resistance.

Thinner insulation panels that improve insulating effectiveness would solve these problems, but ultra-thin, highly effective, and long-lasting insulation panels are not easy to make. In fact, prior to this invention, each of these criteria, i.e., ultra-thin, highly effective, and long-lasting, has been mutually exclusive of at least one of the others.

There have been some notable attempts prior to this invention to improve insulation effectiveness with somewhat thinner panels. For example, U.S. Pat. No. 2,989,156, issued to F. Brooks et al., discloses an insulation panel comprising an evacuated space between metal sheets, which evacuated space is filled with perlite powder. U.S. Pat. No. 3,151,365, issued to P. Glaser et al., shows the use of a mixture of fine carbon black particles and other fine particles filling an evacuated, enclosed structure, intermediate foil radiation shields, and an emissivity-reducing coating of silver. The H. Strong et al., patent, U.S. Pat. No. 3,179,549, uses a mat of very fine, oriented glass fibers sealed inside an evacuated, welded metal envelope. The vacuum used is only about $10^{-4}$ atmospheres ($10^{-2}$ Torr), and it requires a fiber mat of sufficient density and thickness to be opaque to thermal infrared radiation. U.S. Pat. No. 4,444,821, issued to J. Young et al., also discloses an evacuated panel filled with a glass fiber mat with plastic edge seal strips and a gettering material positioned in the evacuated chamber. This panel also specifies only a low-grade vacuum of about $10^{-2}$ Torr. The N. Kobayashi patent, U.S. Pat. No. 4,486,482, also uses a glass fiber mat inside a vacuum envelope made of welded stainless steel sheets. This glass mat is stitched with glass fibers that run perpendicular to the plane of the mat and are supposed to support the external atmospheric pressure load on the panel walls to keep them from collapsing.

The above-described prior art vacuum panels are no doubt more effective than conventional foam and fiberglass insulation panels. However, constructing a truly effective and long-lasting insulation panel is not easy and is not achieved by these prior art structures to the extent necessary to meet the needs described above. For example, the low-grade vacuums used in the prior art patents cannot achieve insulation efficiencies high enough for use in ultra-thin panels. Plastic edge seals cannot maintain a vacuum over an extended period of time, and they really cannot withstand high-temperature exposure or solar radiation exposure without serious degradation and outgassing. Metal envelopes with welded seams will hold the required vacuum, but it is virtually impossible to achieve the perfectly leak-free welds required for maintaining very high-grade vacuums over many years, when such welds have to be made in the presence of the billions of microscopically fine glass fibers and perlite particles used in prior art panels. A single particle or fiber intruding into the weld area could create a microscopic leak that would be very difficult to detect, but would never-the-less seriously compromise the lifetime of the vacuum inside the sealed insulation panel, thus compromising the usefulness of the panel.

The use of a vacuum results in the need for a sufficient structure inside the panel to hold the opposite panel walls from collapsing together. The glass fiber mats and perlite powders used in the prior art panels described above can serve that function. However, in high-order vacuums the inwardly directed sidewall pressures become very great so that such fiber mats and powders become more tightly compacted, thus offering more direct heat conduction paths through the insulation panel than desired. Also, to be really adaptable for a wide variety of uses, the insulation panel should be bendable around curves. However, bending the prior art panels would almost certainly crimp one wall sheet of the panel into the other, thereby forming a "cold short" where one wall or sheet touches the other. Even if the glass fiber mats of the prior art would physically hold the two opposite sheets apart, the mat itself would be so compressed at the crimp or bend that it would virtually form the cold short itself.

The laser-sealed vacuum insulating window invented by David K. Benson, one of the joint inventors of this invention, and C. Edwin Tracy, now U.S. Pat. No. 4,683,154, solved the problem of long-term sealing and structural support against collapse or cold short by laser-welding glass spacer beads between two glass sheets. However, that structure is quite thick, heavy, and fragile, being made with glass, and it is rigid, so it cannot be bent around curves. Therefore, while it is a highly efficient insulation panel, its utility is limited.

SUMMARY OF THE INVENTION

Accordingly, a general object of the present invention is to provide a highly effective, ultra-thin insulation panel.

Another object of the this invention is to provide a highly effective, ultra-thin insulation panel that is durable, resistant to degradation, e.g., by high temperatures, corrosive fluids, and sunlight, and that is long-lasting and bendable without damage or significant loss of insulating capability.

A more specific object of this invention is to provide a highly effective, ultra-thin insulation panel that has superior manufacturability, thus more consistent, dependable quality at a reasonable cost.

A more specific object of this invention is to provide a monolithic, yet very effective glass or ceramic spacer for use alone or in combination with additional similar glass or ceramic spacers in a high-grade evacuated chamber between two rigid, yet bendable metal sheets forming an insulation panel, which is easy to manufacture and use.

Another specific object of this invention is to provide a plurality of discrete glass or ceramic spacers between side sheets that form a vacuum chamber at predetermined spatial relationships to each other and a method of positioning such discrete spacers during assembly.

Additional objects, advantages, and novel features of the invention are set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described herein, the article and apparatus of this invention may comprise two adjacent metal sheets spaced closely together with a plurality of spherical glass or ceramic beads or other discrete shapes optimally positioned between the sheets to provide mechanical support to maintain the spacing therebetween while minimizing thermal conductance and sealed with a metal weld around the edges. The glass beads or other shapes can, according to this invention, be formed in one or more monolithic sheets and positioned between the metal sheets. One preferred form of such monolithic sheets includes a sheet of glass web with a plurality of spherical nodules protruding in opposite directions from the web. Another preferred form includes a sheet of glass web with a plurality of elongated ribs protruding in opposite directions from each side. A plurality of such glass sheets can be laminated between the two outside metal sheets to further reduce linear heat conductance paths across the panel. A similar effect can be obtained by providing the two outside metal sheets textured with ribs or convex protrusions with the two outside sheets separated one from the other by a flat sheet of glass webbing. Other specific embodiments of the invention include the insulation panels configured in particular structures that enhance strength and flexibility, as well as useful configurations for particular purposes. Another structural embodiment includes a helical wound glass or ceramic spacer bead that can be used to separate two concentric, cylindrical metallic sheets in the shape of a tubular conduit or pipe.

Further, the method of this invention includes using polystyrene-coated beads positioned in a jig, contacting the beads with one outer metal sheet heated enough to melt the polystyrene to adhere the beads to the one outer sheet and lifting them out of the jig, clamping the beads between two outer metal sheets, heating to break down and outgas the polystyrene and evacuating to the range of $10^{-6}$ Torr ($10^{-8}$ atmosphere), and sealing by welding the seams around the edges of the outer metal sheets. One or more low-emissivity surface coatings can be used to minimize thermal infrared radiation, and a reactive metal getter is installed in the vacuum insulation to help maintain the vacuum.

BRIEF DESCRIPTION OF THE DRAWINGS

The accompanying drawings, which are incorporated in and form a part of the specifications, illustrate the preferred embodiments of the present invention, and together with the description serve to explain the principles of the invention.

IN THE DRAWINGS

Figure 1:
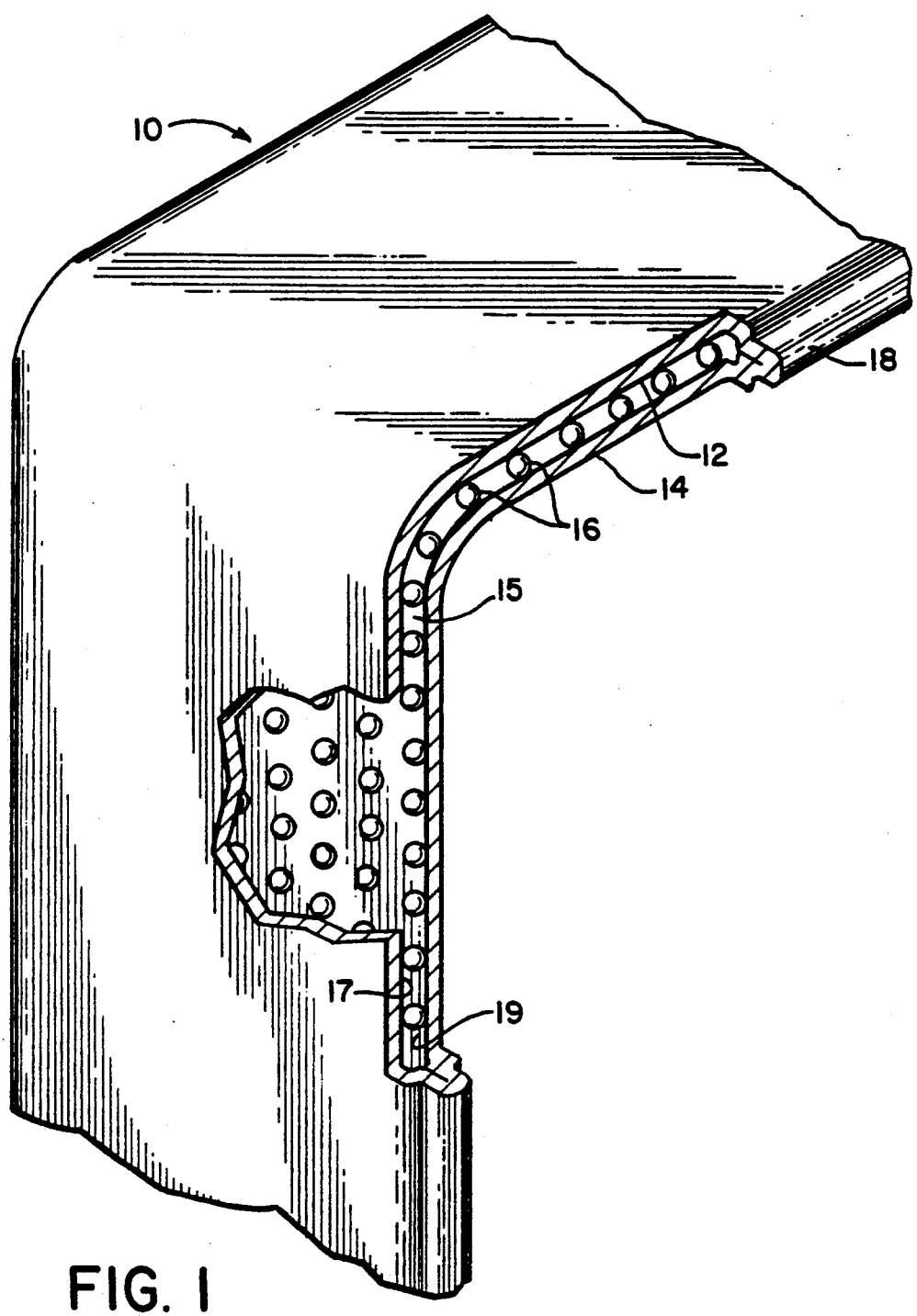
Figure 2:
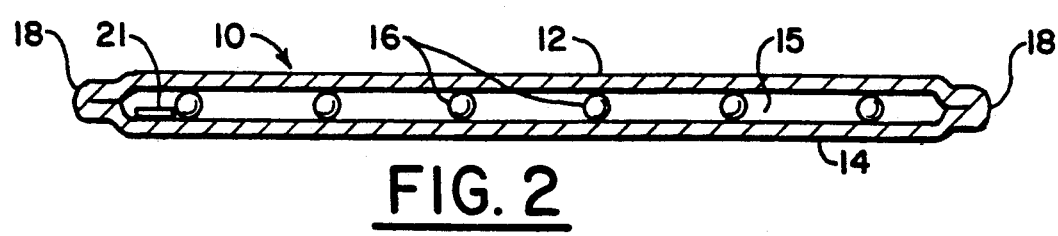
Figure 3:
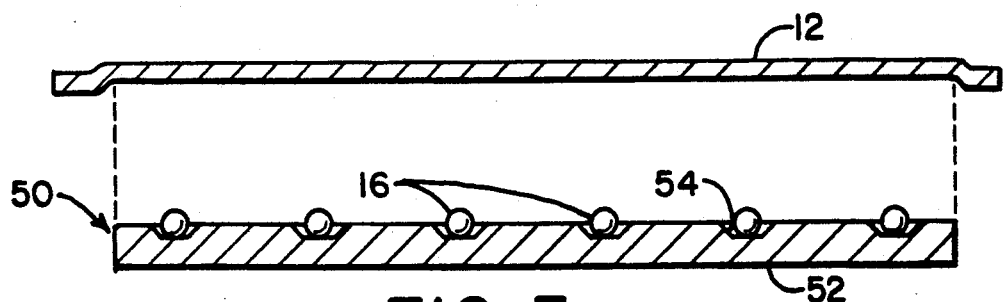
Figure 4:
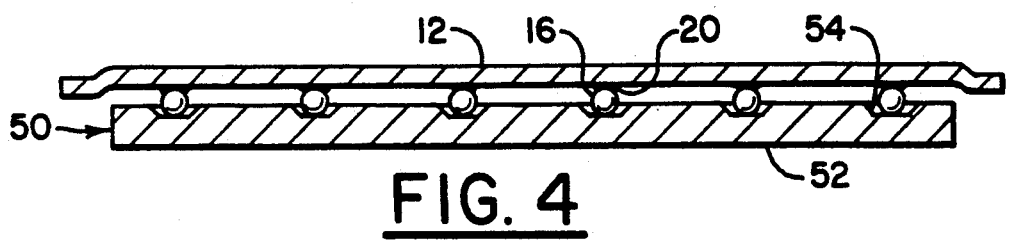
Figure 5:
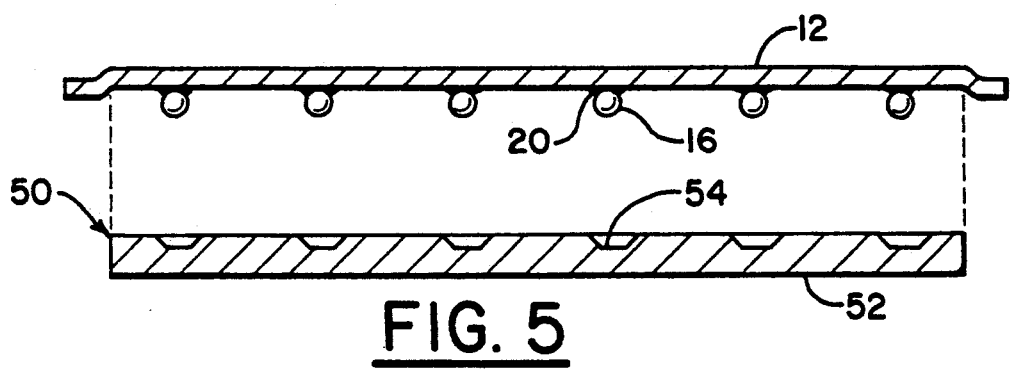
Figure 6:
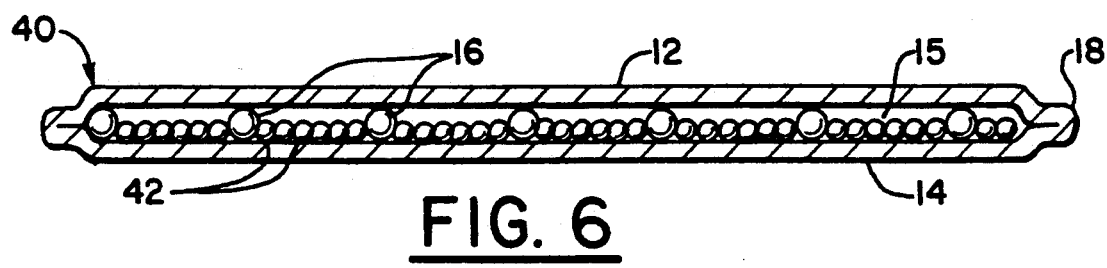
Figure 7:
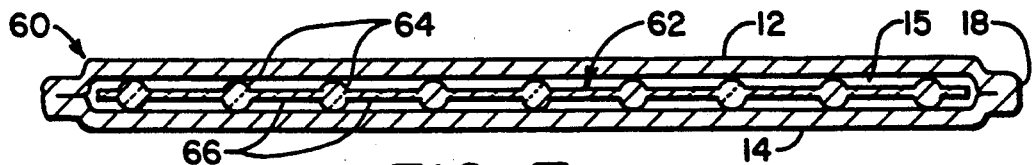
Figure 8:
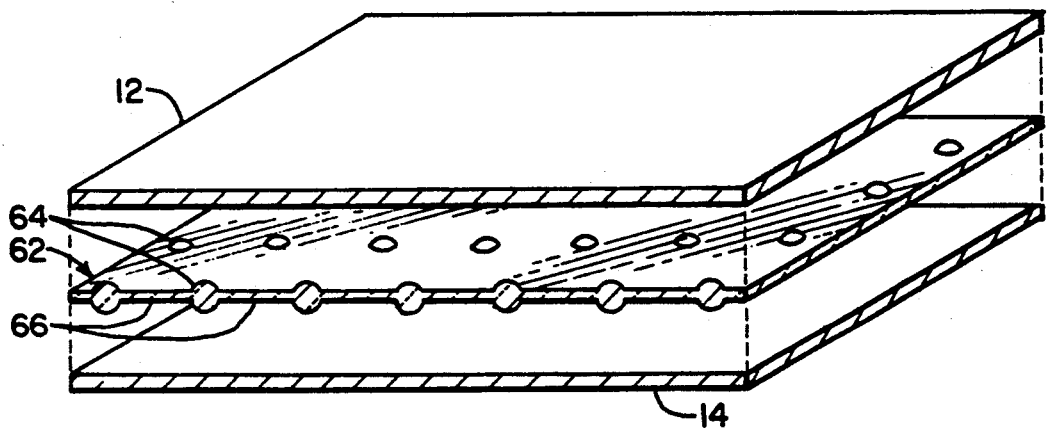
Figure 9:
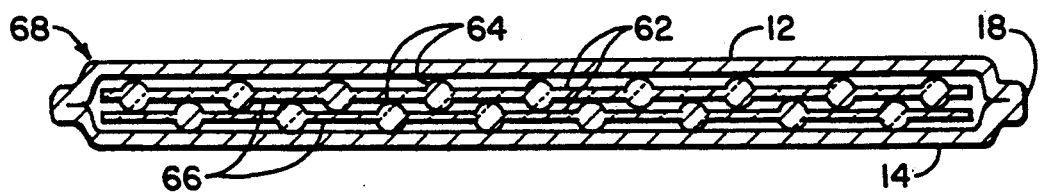
Figure 10:
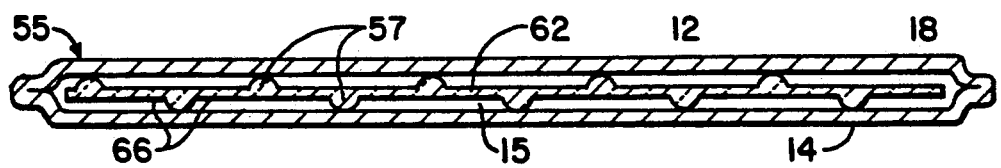
Figure 13:
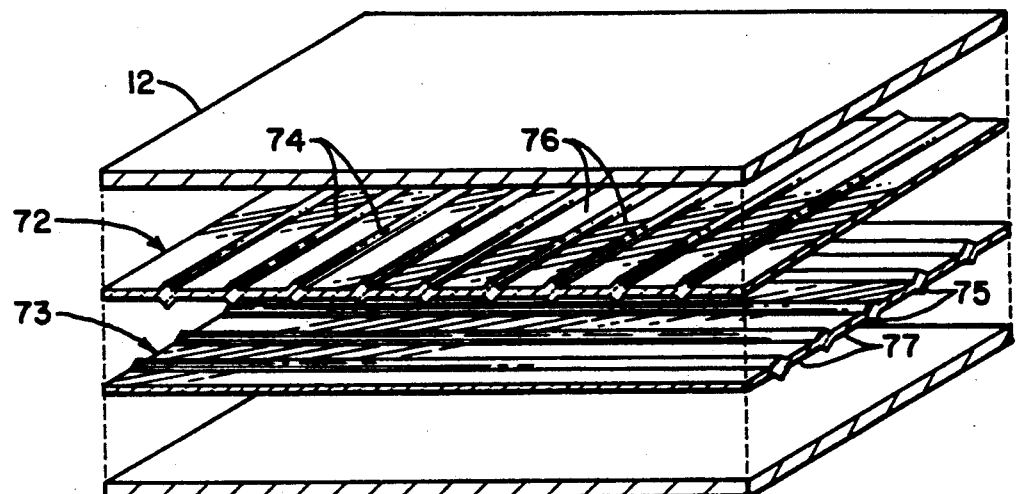
Figure 11:
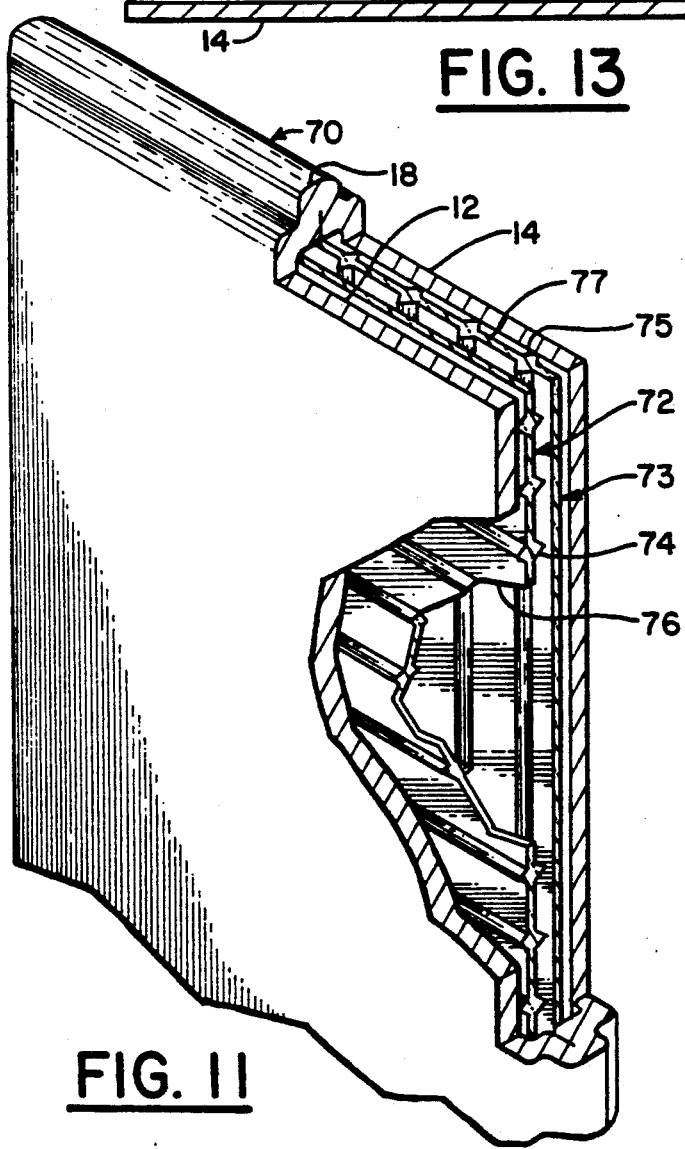
Figure 12:
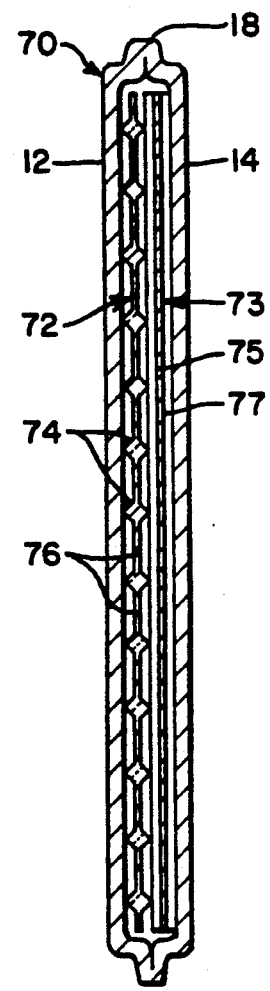
Figure 14:
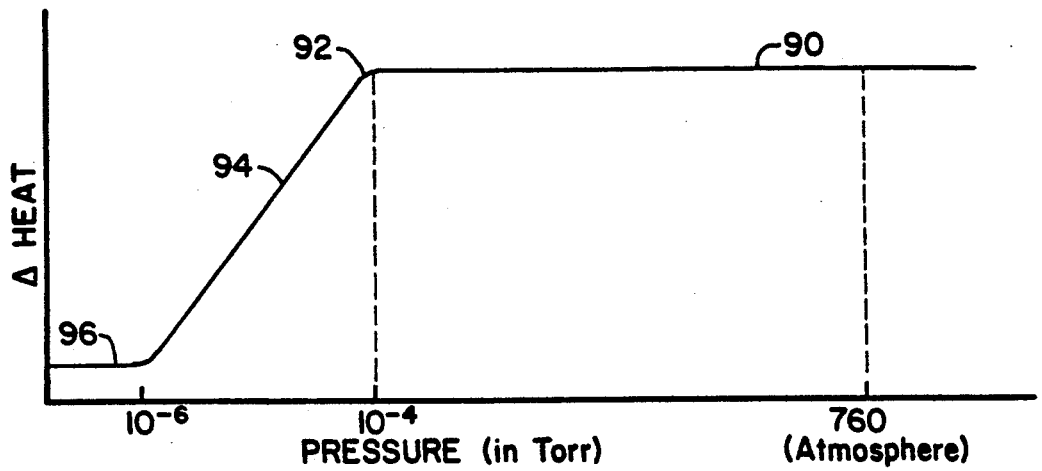
Figure 15:
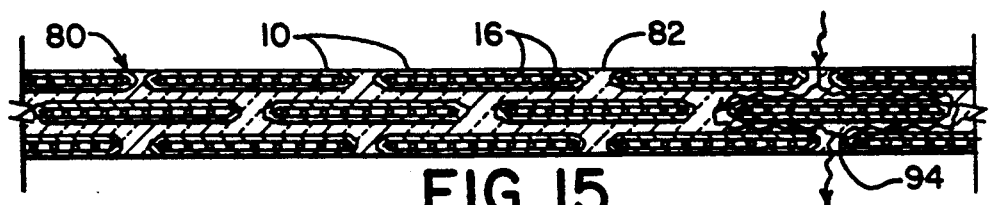
Figure 16:
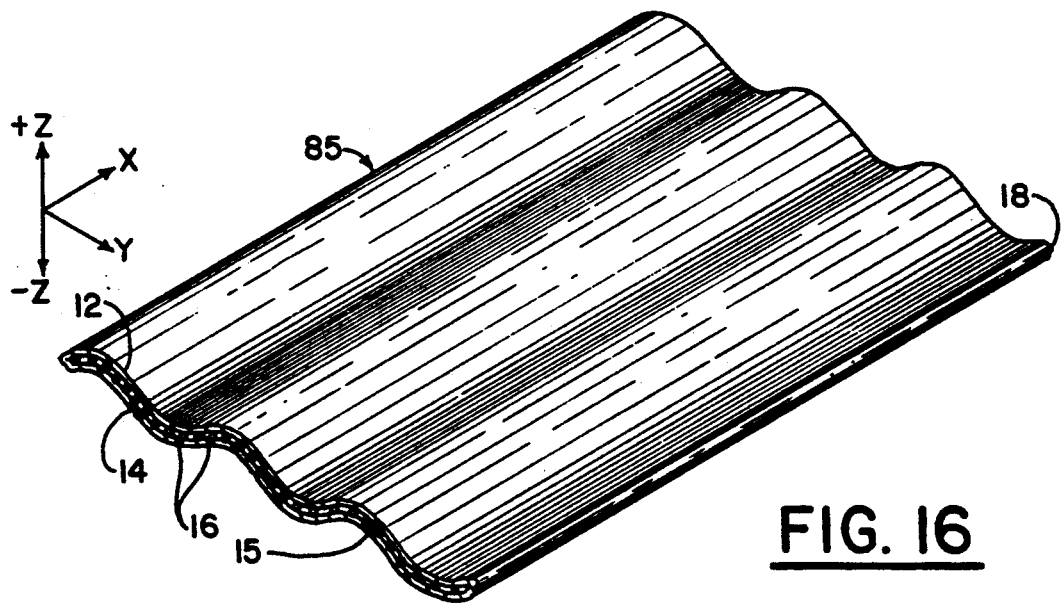
Figure 17:
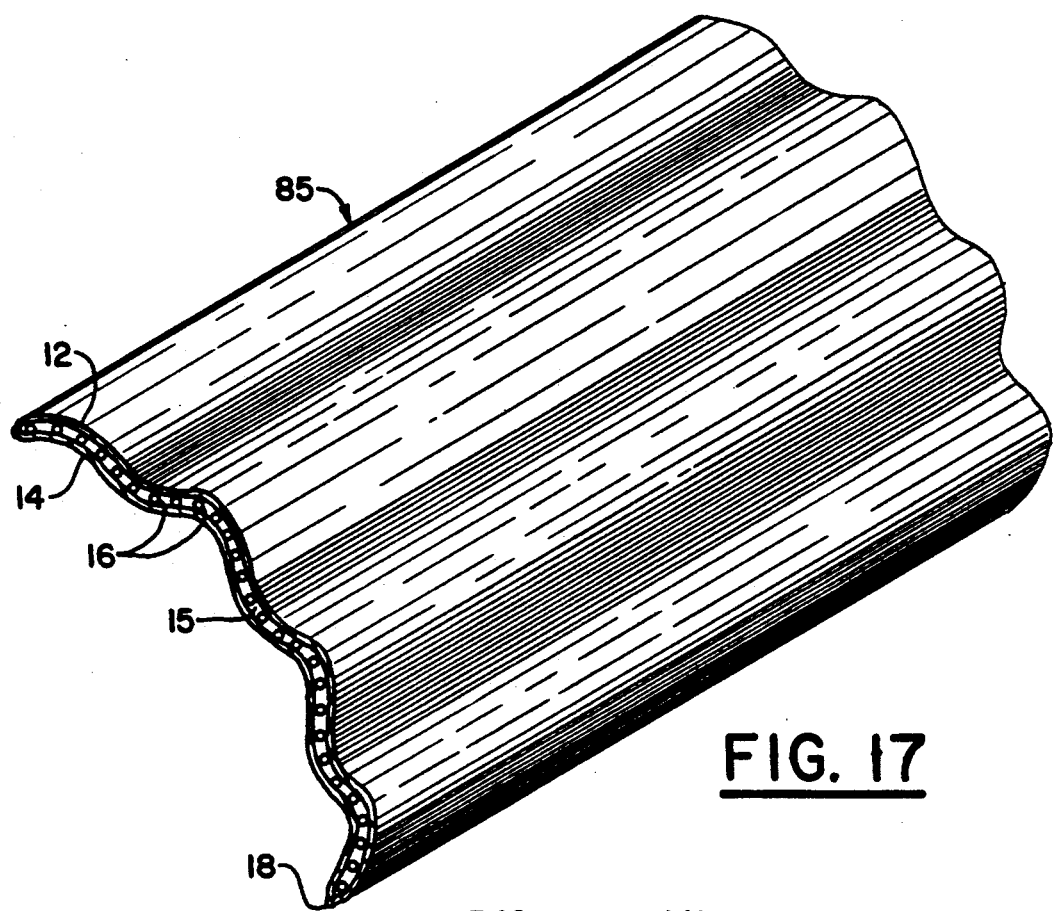
Figure 26:
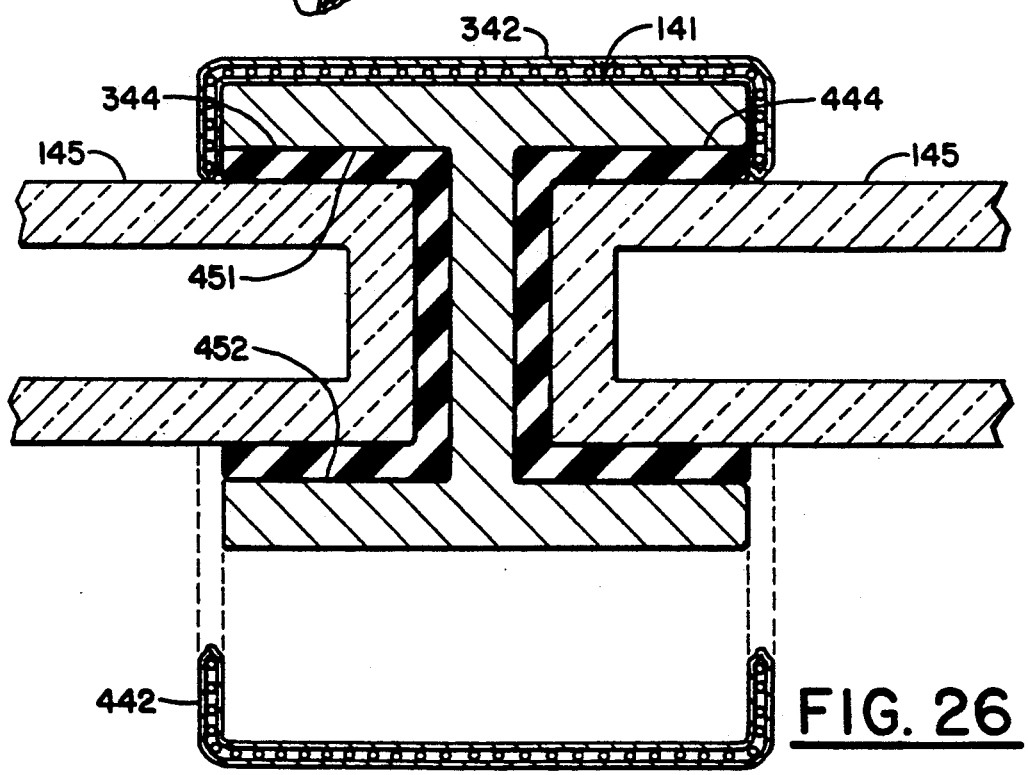
Figure 18:
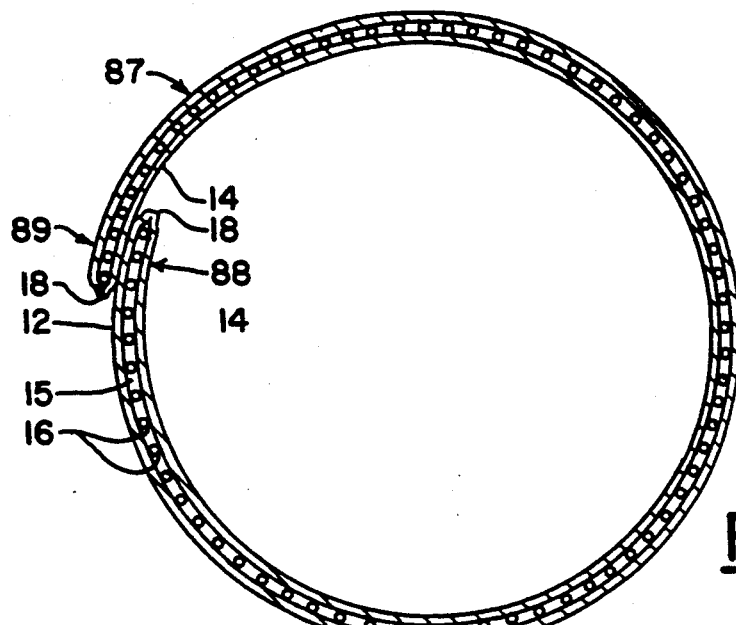
Figure 19:
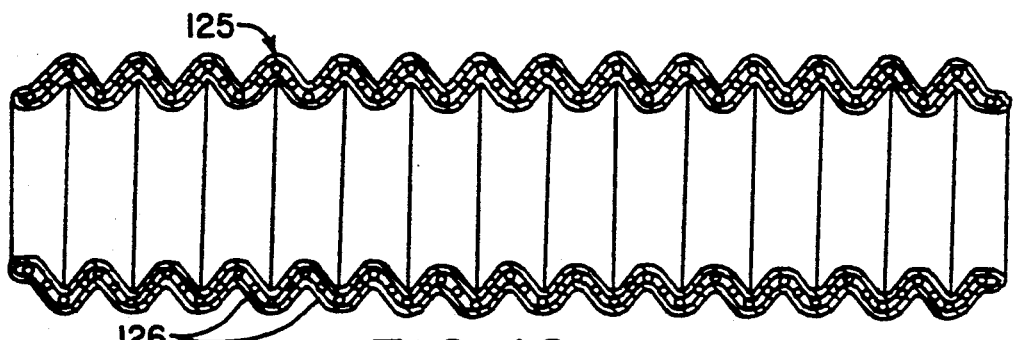
Figure 20:
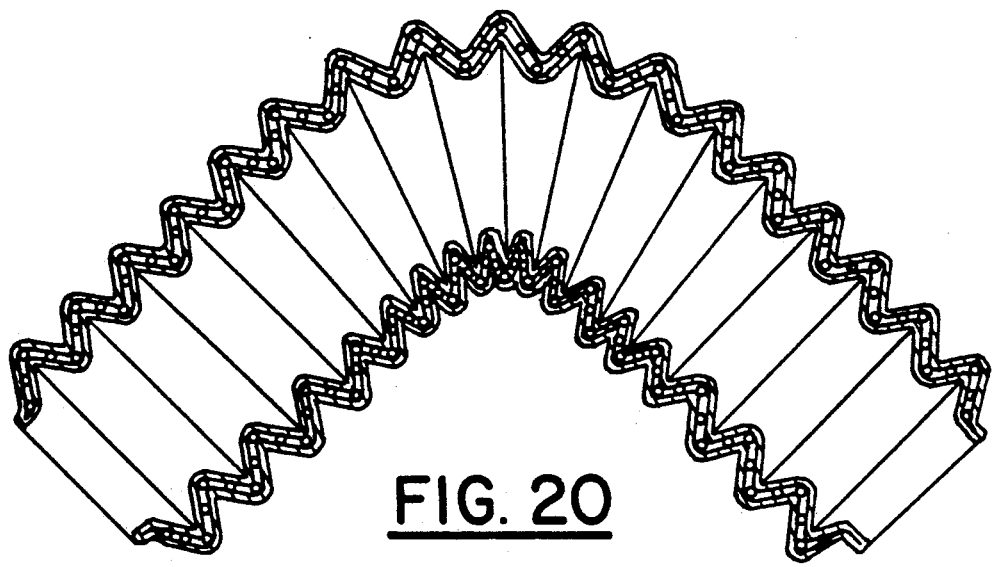
Figure 21:
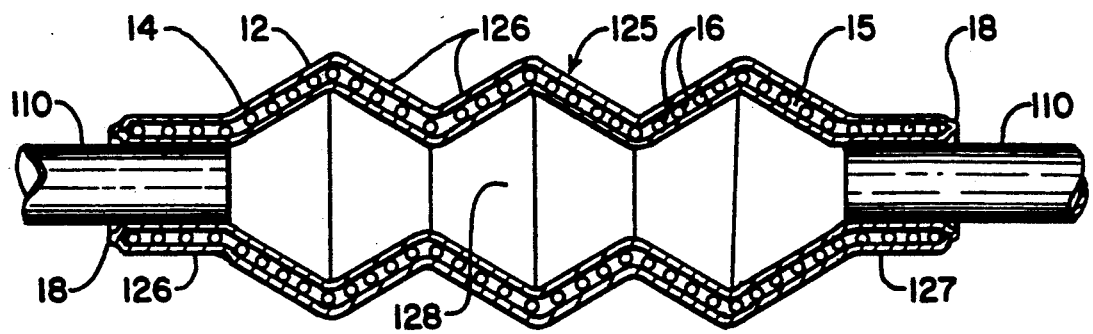
Figure 22:
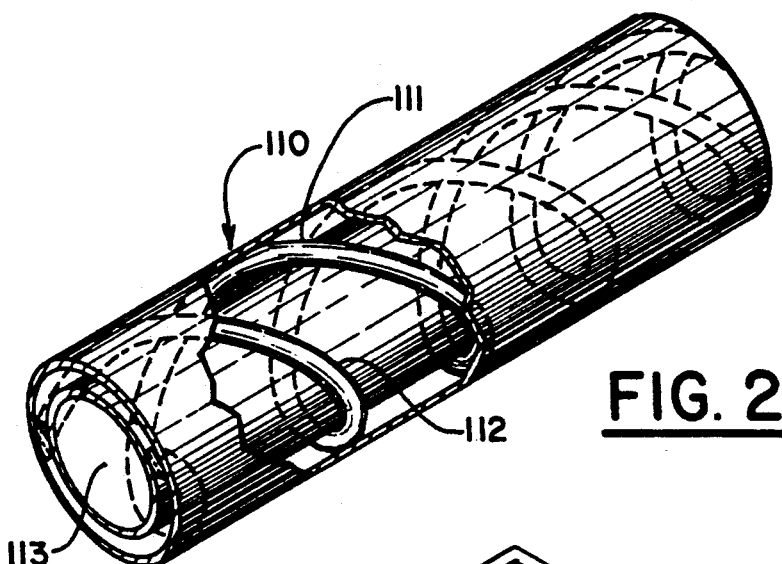
Figure 23:
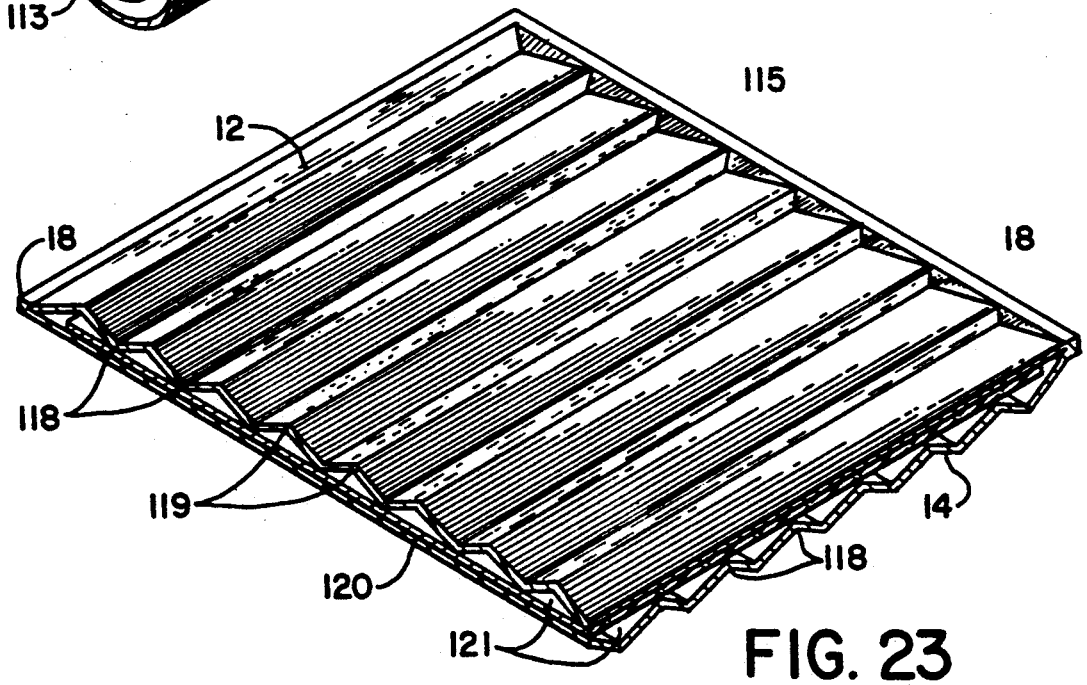
Figure 24:
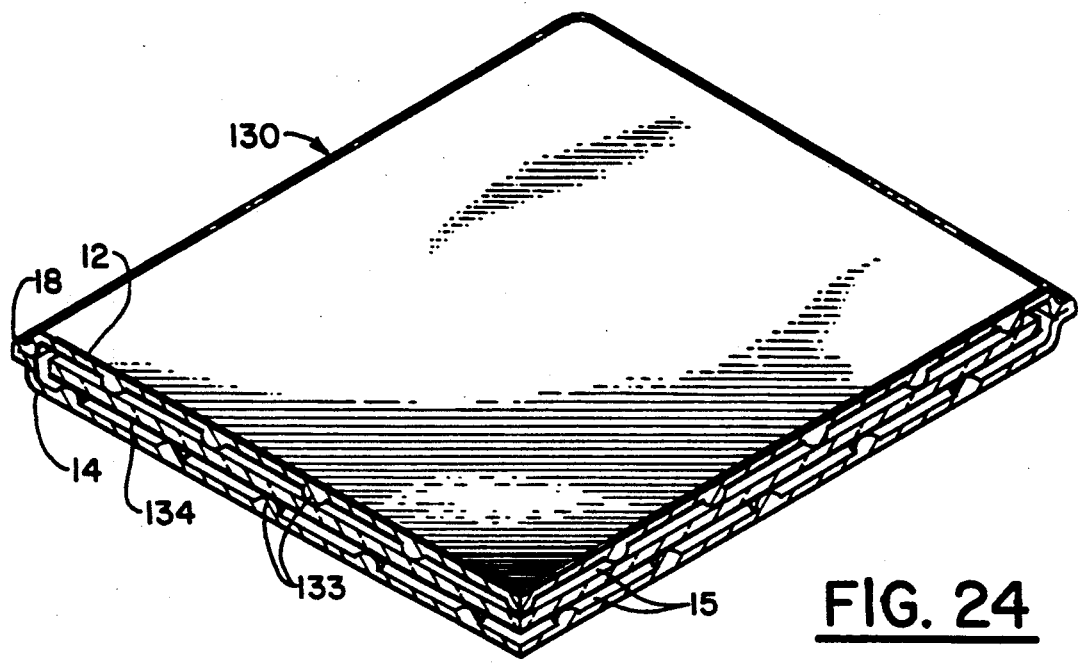
Figure 25:
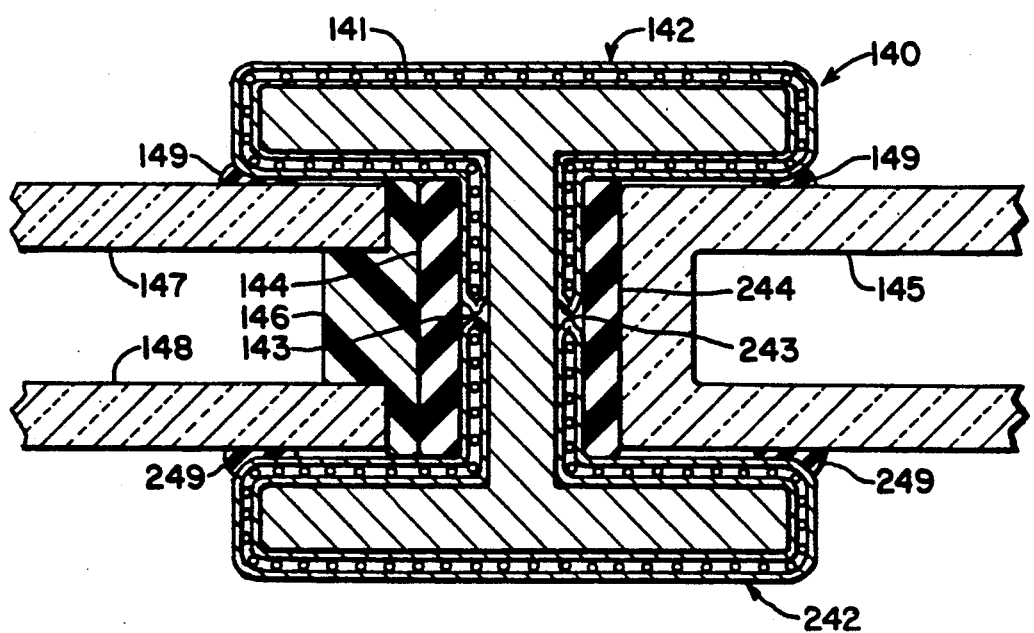

FIG. 1 is a perspective view of a segment of an insulation panel constructed according to the present invention with a portion of the edge seam and one side wall cut away to reveal the spacer beads positioned therein;

FIG. 2 is a cross-section of a preferred embodiment insulation panel according to the present invention;

FIG. 3 is a cross-section of a plurality of beads positioned in a jig prior to attachment of the beads to one of the exterior metal sheets of an insulation panel according to this invention;

FIG. 4 is a cross-section of the assembly jig with the one outside sheet being attached to the beads on the jig;

FIG. 5 is a cross-sectional view of the jig similar to FIGS. 3 and 4, but with the beads attached to the outside sheet of the panel;

FIG. 6 is a cross-sectional view of an alternate embodiment of the insulation panel according to this invention with a plurality of smaller beads used as initial spacers for positioning the large beads;

FIG. 7 is a cross-sectional view of another embodiment of the present invention wherein the glass spacer beads are formed integrally with a monolithic spacer sheet;

FIG. 8 is a fragmented, exploded view of a panel assembly utilizing the monolithic spacer sheet of the embodiment FIG. 7;

FIG. 9 is a cross-sectional view of an embodiment similar to that shown in FIG. 7 and 8, but utilizing two of the monolithic spacer sheets;

FIG. 10 is a cross-sectional view of an insulation panel embodiment that has a monolithic glass spacer comprising a web with a plurality of nodules protruding from opposite sides with the nodules on one side of the web offset laterally from the nodules on the other side;

FIG. 11 is a perspective view of a portion of still another embodiment of the insulation panel according to the present invention with a portion of the edge seam and front panel and one of the monolithic spacer sheets cut away to reveal the complete structure, this embodiment of the monolithic spacer sheet having a plurality of elongated ribs, with the spacer sheets oriented so that the ribs of one spacer sheet run cross-wise to the ribs of the other;

FIG. 12 is a cross-sectional view of the insulation panel embodiment shown in FIG. 11;

FIG. 13 is a fragmentary, exploded view illustrating the assembly of the insulation panel embodiment of FIGS. 10 and 12;

FIG. 14 is a graph illustrating effective heat transfer in relation to vacuum in the panel;

FIG. 15 is a cross-sectional view of a composite insulation panel comprising of a plurality of the insulation panels described above imbedded in either a rigid or a flexible foam material;

FIG. 16 is a perspective view of a section of insulation panel according to this invention formed in a corrugated configuration;

FIG. 17 is a perspective view of a corrugated insulation section similar to that shown in FIG. 16, but further formed into a curved insulation panel;

FIG. 18 is a cross-sectional view of an insulation panel according to this invention formed into a cylinder with overlapping lateral edges;

FIG. 19 is a cross-sectional view of a composite insulation panel according to this invention formed as a rippled tube or conduit section that is longitudinally expandable and contractable;

FIG. 20 is a cross-sectional view of the composite rippled tube or conduit section of FIG. 19 shown formed around a bend;

FIG. 21 illustrates in cross section a composite rippled tube or conduit section similar to that shown in FIG. 19 used to connect together two immovable lengths of solid and unstretchable insulated pipes that may be formed according to embodiments of this invention;

FIG. 22 is a perspective view of a tubular insulated conduit according to this invention in which one or more helical glass spacers are used to hold apart two metallic tubular skin sections to form an insulated pipe or conduit;

FIG. 23 is a perspective view of an alternate embodiment of the insulation panel according to the present invention in which the glass spacer is a flat web and the two metallic outer sheets are textured with ribs running transverse to each other;

FIG. 24 is a perspective view of an alternate embodiment similar to that in FIG. 23, but wherein the metallic outer sheets have protruding nodules instead of ribs;

FIG. 25 is a cross-sectional view illustrating an application of the insulation panel of the present invention for isolating thermal pane windows from a metal frame structure as well as for insulating against heat transfer through solid structural members that support glazing or other building materials; and FIG. 26 shows the insulated panel according to the present invention formed as a press-on cap to block heat transfer through a window frame or other structural unit.

DETAILED DESCRIPTION OF THE PREFERRED EMBODIMENTS

The ultra-thin insulation panel 10 embodiment according to this invention shown in FIG. 1 comprises of two outer sheets or walls 12, 14 positioned in closely spaced-apart relation to each other. The seams around the edges of the panel where the two outer sheets or walls 12, 14 meet are sealed, preferably by welding, as shown at 18. The interior chamber 15 enclosed by the outer sheets or walls 12, 14 is evacuated to a high-grade vacuum in the range of at least $10^{-5}$ Torr, and preferably tot the range of $10^{-6}$ Torr. To hold this high-grade vacuum for many years, the edge seams 18 have to be sealed with almost perfectly leak-proof quality.

When the chamber 15 is evacuated as described above, the atmospheric pressure on the outsides of the wall sheets 12, 14 would normally collapse the wall sheets 12, 14 together, thereby causing a cold short or direct thermal conduction path from one wall to the other across the panel. To avoid such collapse, a plurality of discrete glass spacers, which can be in the form of spherical beads 16, are positioned optimally to provide mechanical support to hold the two wall sheets 12, 14 apart, while minimizing thermal conductance. It is preferred that the metal wall sheets 12, 14 be formed of a low thermal conductivity metal such as stainless steel or titanium, both of which are easily weldable in a vacuum and are sufficiently hard or rigid so that they do not form around the spherical spacers, yet are bendable enough so the panel can be formed in curves. Therefore, a near "point" contact is maintained between each spherical glass bead spacer 16 and the metal wall sheets 12, 14. For high-temperature applications, the beads 16 can be ceramic beads instead of glass, so that they maintain their structural integrity, spherical shape, and near "point" contact with the metal walls 12, 14. Therefore, while this discussion, specification, and claims refer most often to the monolithic spacers as being glass, it is to be understood that ceramic spacer materials are also appropriate equivalents and are included within the scope of this invention.

Once the spacer beads 16 are properly positioned and the chamber 15 is evacuated, the atmospheric pressure on the outside surfaces of the wall sheets 12, 14 tightly squeezes or clamps the sheets 12, 14 against the bead spacers 16, thereby holding them in position. With proper spacing of the spacer beads 16, the insulation panel 10 can even be bent or formed around a curve, as shown in FIG. 1, and the spacer beads 16 maintain the spacing between the wall sheets 12, 14 in the bend without crimping or allowing a cold short between the two wall sheets 12, 14.

While there may be a number of ways to affix the spacer beads 16 in optimum spaced relation to each other in the chamber 15, one preferred method of doing so is illustrated in FIGS. 3 through 5. Specifically, the spacer beads 16 are initially coated with a polystyrene or similar adhesive material. These polystyrene-coated beads 16 are then poured onto the surface of a bead jig 52, which has a plurality of pockets 54 formed in its surface with the proper spacing as desired for holding the spacer beads 16. One wall sheet 12 is heated and lowered into position on top of the spacer beads 16 as shown in FIG. 4. The heat from the wall sheet 12 melts the polystyrene on the surface of the spacer beads 16 to adhere the beads 16 to the wall sheet 12 as shown at 20 in FIG. 4. The wall sheet 12 is then allowed to cool, thereby allowing the polystyrene to cool and adhere the spacer beads 20 to the interior surface of the wall sheet 12. Once adhered, the wall sheet 12 can be lifted off the jig 52, as shown in FIG. 5, with the beads 16 retained in proper position. Then, the other wall sheet 14 can be joined as shown in FIG. 2. With the two wall sheets 12, 14 clamped together and with the beads 16 in proper position, the assembly is then heated to a sufficient temperature to break down the polystyrene into more volatile styrene monomers, which vaporize at such temperatures. The temperature should not be so high as to break down the polystyrene into its carbon elements, because the carbon is higher in conductivity, and it has a higher infrared emissivity than desired. Under those temperature conditions, the chamber 15 can be evacuated, and, while held under the vacuum, the edges 18 can be welded to seal the vacuum in the chamber 15.

As mentioned above, other methods may also be used to secure the beads in place while the clamping evacuation and weld sealing operations take place. For example, with ceramic beads 16 and titanium sheets 12, 14, the beads 16 may be positioned and maintained with proper spacing electrostatically. Also, the beads may be held in proper position by a metal mesh until the outer wall sheets 12, 14 clamp them in place, or they may be strung on wires or glass fibers.

The embodiment 40 shown in FIG. 6 is similar to that shown in FIGS. 1 and 2 above, with the exception that the large spacer beads 16 are positioned on the bottom wall sheet 14 and held in proper spacing by a plurality of smaller diameter beads 42. Again, once the top sheet 12 is clamped in position, the chamber 15 evacuated, and edges 18 welded shut, the spacer beads 16 will be held in position by the atmospheric pressure on the outside of the panel.

Another embodiment 60, as shown in FIG. 7, has the spacer beads 64 formed as an integral part of a monolithic spacer sheet 62. This monolithic spacer sheet 62, which is also illustrated in FIG. 8, is one unitary sheet of glass web 66 with a plurality of spherical nodules 64 extending outwardly in both directions from the web 66. This monolithic spacer sheet 62 can merely be positioned on the bottom wall sheet 14, and then the top wall sheet 12 can be placed in position. Once the chamber 15 is evacuated and the edges 18 sealed, the spacer nodules or spheres 64 will be clamped into position by the atmospheric pressure. Therefore, it will not make any difference if the webbing breaks after the panel has been assembled. Consequently, after assembly, if it is desired to bend the panel 60 around a curve, which would break the glass web 66, the insulating quality and structural integrity and spacing between walls 12, 14 of the panel 60 itself will be maintained by the nodules 64.

The embodiment 68 shown in FIG. 9 is similar to that shown in FIGS. 7 and 8, with the exception that two of the monolithic spacer sheets 62 are utilized. The spacer sheets are positioned such that the nodules 64 of one sheet 62 touch one outside wall sheet 12 and one side of the web 66 of the adjacent panel on the other side. This embodiment defines a more tortuous path through a series of "point" contacts in which heat must be conducted to make it from one side of the panel 68 to the other, thus further increasing the thermal efficiency thereof.

A similar effect of not having any straight heat conducting paths transversely through the insulation panel is incorporated in yet another embodiment 55 as shown in FIG. 10. A single spacer sheet 62 is used, but hemispherically-shaped nodules 57 are spaced so that no nodule 57 touching outside wall sheet 12 is directly opposite a nodule 57 that touches inside wall sheet 14. Once again a tortuous path through a series of "point" contacts, that is, from wall 12 to a nodule 57, through web 66 of sheet 62 to another nodule 57, then to wall 14, is provided. With chamber 15 between walls 12, 14 highly evacuated, this tortuous path once again provides high thermal efficiency.

Another highly effective insulation panel embodiment 70 according to this invention is shown in FIGS. 11 through 13. In this embodiment 70, two monolithic spacer sheets 72, 73 are used, each of which has a plurality of elongated ribs 75, 74 separated by webs 77, 76, respectively. These monolithic spacer panels 72, 73 are positioned next to each other so that the ribs 74 of sheet 72 run perpendicular to the ribs 75 of sheet 73. In this manner, the ribs 74 of sheet 72 have line contacts with outer wall sheet 12. Likewise, the ribs 75 of sheet 75 have line contacts with the other outer wall sheet 14. Such line contacts do make it somewhat more difficult for heat to flow by conduction. Further, the contacts between the ribs 74 on sheet 72 and ribs 75 on sheet 73 are essentially "point" contacts, thus almost negligible heat conductors.

For even higher insulation effectiveness, a plurality of smaller panels made as described above, such as any of the embodiments 10, 40, 60, 68, 70, can be stacked or laminated together. For example, as shown in FIG. 15, a plurality of panels 10 are stacked or laminated together in a composite panel 80 by embedding them in, or adhering them to, a more conventional insulation material 82, such as either rigid or flexible foam insulation or even a consolidated powder insulation material. The panels 10 are preferably staggered with a layer of the conventional material 82 positioned between each panel 10. This arrangement requires any heat that traverses the conventional insulation material 82 in the composite panel 80 shown in FIG. 15 to travel a tortuous path as indicated by the arrow 94. An R50 or greater insulation value can be provided with a composite panel 80 only one inch thick. Composite panels 80 built with this structure can be easily formed around curves or used in any shape desired.

A number of means are available for increasing the strength and utility of panels that are fabricated with the principles of embodiment 10 as shown in FIG. 2. FIGS. 16, 17, 18, 19, and 20 illustrate some of these means.

An embodiment 85 in FIG. 16 is based on the principles of embodiment 10 and provides for corrugations in a direction parallel to the X-axis, as illustrated in FIG. 16. Spherical nodules 16 or other glass spacers as described above separate walls 12 and 14, and chamber 15 is highly evacuated. Welded seal 18 maintains the vacuum. The corrugations keep the panel 85 rigid in one direction while permitting it to bend in another direction, as shown in FIG. 17. According to FIG. 16, if embodiment 85 is generally oriented with the plane formed by the X-Y axes, then the embodiment is rigid with respect to movement in the X to +Z or X to −Z directions; and flexible with respect to movement in the Y to +Z and Y to −Z directions.

An embodiment 87 according to FIG. 18 is also constructed in accordance with the general principles of embodiment 10 of FIG. 2 or of other insulated panel embodiments as described above. However, in embodiment 87, the insulated panel is bent into a cylinder or other enclosing configuration in which walls 12, 14 overlap at ends 88, 89, thereby reducing thermal energy loss through welded seams 18. Such ability to bend the panel and overlap ends provides a thermally efficient means of joining of ends 88, 89 of embodiment 87 for such uses as wrapping hot water heaters and other vessels that need to be insulated.

An insulation panel according to the present invention can also be formed in a rippled tube or conduit embodiment 125, as shown in cross-section in FIG. 19. The ripples or accordion folds 126 allow this tube or conduit 125 to be curved or bent, as illustrated in FIG. 20, or longitudinally expanded or contracted, such as to join two immovable rigid conduits 110, as shown in FIG. 21.

A less flexible insulated tube or pipe embodiment 110 shown in FIG. 22 has smooth interior and exterior walls 12, 14. Wall 12 forms the outer surface of the insulated pipe, while wall 14 forms the inner conduit 113. Separation between walls 12, 14, forming evacuated space 15, is shown in FIG. 22 maintained by helical glass or ceramic spirals 111, 112, although other aggregate or monolithic spacer embodiments as described above can also be used to maintain the vacuum space. A very high thermal insulation efficiency in thin-wall tubes or pipes can be provided for fluids or gasses, including cryogenics, flowing or contained within conduit 113 with this pipe embodiment 110. The ends of lengths of these insulated pipes 110 can be joined together or to conventional pipes by the rippled connector 125, as described above. When the ends 126, 127 of connector 125 overlap the ends of pipe 110, as shown in FIG. 21, insulation effectiveness is maintained at these joints, even if they are welded.

Embodiment 115 according to FIG. 23 comprises two corrugated walls, 12, 14, having elongated ribs or protrusions 122 forming valleys 118 and peaks 119, and a monolithic glass spacer 120, placed between walls 12, 14. Walls 12, 14 are joined by welded seam 18. Wall 12 is oriented so that its ribs 122 form right angles to the ribs of wall 14. Spacer 120 separates the valleys 118 of wall 12 and wall 14. The right-angle orientation of the ribs 122 of the respective walls 12, 14 forms essentially very small dimensional (almost point) direct transverse contacts or heat transfer paths through the glass spacer 120 where the valleys 118 of the respective walls 12, 14 cross each other. In this sense, this embodiment is effectively a structural inverse of the embodiment 70 of FIGS. 11-13 and described above. The chamber 121 formed under peaks 119 of walls 12, 14 is evacuated. Such an arrangement provides an insulation panel structure that is very rigid and possesses great strength in relation to its weight, while also providing a high degree of thermal insulation.

Embodiment 130 according to FIG. 25 is similar in concept to embodiment 55 of FIG. 10, except that hemispherical nodules 133 are formed on walls 12, 14 of embodiment 130. Spacer 134 is a flat plate of monolithic glass or ceramic. Welded seam 18 provides a seal to maintain the vacuum of evacuated chamber 15. Therefore, the panel 130 is generally the structural inverse of panel 55 and provides similar advantages and insulation effectiveness.

Still another embodiment 140 is shown in FIG. 26. Embodiment 140 may be used for thermal-break construction of structural windows. For example, an I-beam or C-channel 141 may provide the basic structural member. Surrounding beam 141 and conforming to its shape are two insulated panel structures 142, 242, for example, constructed similar to that shown in embodiment 10 of FIG. 2 or according to any of the other suitable panel structures described above. Thermal break spaces 143, 243 separate structures 142, 242. Cushion pieces 144, 244 fit snugly against structures 142, providing a seal and providing for differential expansion of glass panes 145, 147, 148. Glass pane 145 is illustrated as an evacuated, fused thermal pane window. Such a typical window can also be composed of a plurality of glass panes 147, 148 edge-sealed by a sealing structure 146, which may be plastic, metal, or any other suitable material. Compressible seals 149, 249 assist in preventing air or water leakage. Embodiment 140 thus provides a strong window structure with a frame structure having highly efficient thermal break properties because of very long thermal conductance paths.

FIG. 26 illustrates a variation of the insulated window mounting structure of FIG. 25, wherein thermal pane windows 145 are retained in an I-beam structure 241 by rubber seals 344, 444 between the windows 145 and the flanges 451 and 452. The insulation panels 342, 442 of this embodiment are formed into C-shaped cross-sections that mount onto and cover the exposed surfaces of the respective flanges 451, 452. Each insulation panel 342, 442 can be only 0.1 inch (2.5 mm) thick, yet can have an R15 insulation value. Therefore, both panels 451, 452 together can provide very neat appearing—almost imperceptible—R30 insulation on window frames 141 and other similar structures that otherwise are virtually cold shorts across building windows.

The beads 16, spirals 101, or monolithic sheets 62, 72, 73, 120, 134 are preferably fabricated of glass for applications where temperatures are less than 400° C. for a number of reasons, the most important of which is the very low outgassing characteristic of glass. Glass also has a high compressive strength, mechanical rigidity, low thermal conductivity, and low cost, and it is easy to use in fabrication. Also, glass is essentially opaque to thermal infrared radiation, which, of course, minimizes radiation heat transfer across insulation panels 10, 100, 115, 130, particularly where the monolithic spacer sheets 62, 72, 73, 120, 134 are used. In applications where temperatures exceed 400° C., the beads 16, spirals 101 or monolithic sheets 62, 72, 73, 120, 134 can be fabricated with a ceramic material.

Optical rejection of heat can also be enhanced by including low-emissivity coatings 17, 19 of copper, silver, or other low-emissivity material, preferably on the interior surfaces of wall sheets 12, 14, 131, 132. Such low-emissivity materials can also be coated on the surfaces of the monolithic spacer sheets themselves, particularly where it is not anticipated that the web 66, 76, 77 or spacers 120, 134 will be broken in a particular application. A metal getter 21, illustrated in FIG. 2, can also be placed in the chamber 15 of any of the panel insulation embodiments described above (although not illustrated in all the figures) prior to evacuating and sealing the chamber 15. The metal getter traps any small amount of reactive gas desorbed from glass beads or metal walls that may occur during the lifetime of many years duration.

The magnitude of the vacuum and its coordination with the width of the vacuum chamber 15 in all the embodiments described above are important. Low-grade vacuums in the range of $10^{-7}$ atmospheres ($10^{-4}$ Torr) are inadequate to contribute much to the thermal transfer resistance or insulating quality of a panel. The flat line 90 in the graph in FIG. 14 illustrates the point that a vacuum does not contribute to any decrease in the rate of thermal transfer across the panel at all until enough of the air (or other gases) has been withdrawn to the extent that the mean free path of a molecule between collisions with other molecules is equal to the spacing or distance between the hot and cold surface. For ultra-thin, high-grade insulation panels as contemplated by this invention, at a vacuum of about $10^{-4}$ Torr, the mean free path is equal to the distance between the two wall surfaces, as indicated by the bend 92 of the graph in FIG. 14. At that point, thermal conductivity of the panel 10 decreases, i.e., insulating effectiveness increases, on a fairly linear basis in direct relation to a decrease in gas pressure in chamber 15, as indicated by line 94 in FIG. 14. Then, at about $10^{-6}$ Torr, a further decrease in pressure does not significantly decrease thermal transfer, because almost all the thermal transfer in that range, indicated by line 96 in FIG. 14, is due to radiation. Therefore, in order to not only take advantage of a vacuum but also maximize the beneficial use of a vacuum in this kind of insulation application, it is necessary to maintain a high-grade vacuum with a pressure in the range of $10^{-6}$ Torr or lower.

For purposes of illustration, the ultra-thin insulation panels according to this invention can be fabricated very effectively and used very beneficially in overall thickness in the range of about 0.1 inch (2.5 mm). The metal wall sheets can be 0.005 to 0.010 inch (0.2 to 0.3 mm) thick, and the spacers can be about 0.08 inch (2 mm). The monolithic glass inserts 62, 72, 73 can be thin, rolled glass sheets with regularly spaced spherical nodules 64 or ribs 74, 75. Gas-phase conduction is nearly eliminated by sealing the chamber 15 under a high-grade vacuum with a pressure of only $10^{-5}$ Torr and preferably $10^{-6}$ Torr or less, as illustrated by FIG. 14 and discussed above. Solid-phase conduction is minimized by the use of low thermal conductivity material, such as glass, for mechanical side wall supports or spacers and by the use of nearly "point" contacts between the supports and the wall sheets, as described above in relation to the specific structures and embodiments illustrated. A 0.1-inch (2.5 mm) thick insulation panel, as described above, can have an insulation value as high as R15, i.e., R=15° F. - hr. ft$^2$/BTU, which resists thermal transfer as well as a 2½-inch thick section of polymer foam or nearly seven inches of standard-density fiberglass.

By way of illustration, and not of limitation, the following is provided to illustrate the advantages of the ultra-thin Compact Vacuum Insulation (CVI) embodiments of the present invention due to such items as its compactness, effective working temperatures, light weight, and reduction in the use of chlorofluorocarbons (CFC).

In many applications a premium is paid for volume, and a high-performance insulation material occupying less volume is therefore more valuable. An indicator of these applications is provided by the growing substitution of more-expensive expanded foam products with R-values of 5 to 10 per inch, or other exotic insulations, for less-expensive bulk insulations such as fiberglass, rockwool and cellulose, with R-values of 2 to 4 per inch. Such applications include: refrigerators; freezers; display case shells for chilled products such as meat, produce, flower, and liquor; refrigerated intermodal transport containers; and refrigerated trucks and trailers, tank, and rail cars; steam and hot and cold water piping; district heating and cooling piping; industrial process hot and cold storage tanks or containers; industrial hot and cold process equipment; automobile, train, plane and ship body shells; building HVAC equipment and ducts; roofs, walls, and floors of buildings; chilled computer circuits and components; diurnal and annual cycle storage tanks; portable hot and cold storage and transport containers; thermal isolation of heat-producing producing computer components and other operations; and temperature maintenance of high temperature processes such as sodium-sulfur batteries and heat-retention diesels.

The ultra-thin CVI insulation panels and conduits according to this invention as described above are just as effective in cryogenic process, transport, and storage situations as the thicker, more complex, state-of-the-art cryopumped insulation, where a layered multifoil insulation is continuously vacuum-pumped by thermal absorption by the extremely cold material itself. However, since the ultra-thin CVI insulation panels and conduits of the present invention do not rely on such cryopumping to maintain their insulation effectiveness, they do not require such energy input or waste. In further contrast, this insulation according to the present invention is also just as effective in ambient and high-temperature applications as it is in low-temperature applications, whereas cryopumped insulation works only at extremely low temperatures, and the ultra-thin CVI of the present invention is much less bulky and more flexible than cryopumped insulation.

Related to this cryogenic application is the case of high-temperature superconductors. As long as superconductivity took place only at cryogenic temperatures, transmission of electricity was through circuits that cryo-pumped their multifoil insulating jackets. Such energy drain due to cryopumping the insulation could be substantial when cryopumping great lengths of superconductor circuit. Such energy drain could be avoided with the ultra-thin CVI insulation of the present invention, as discussed above. Equally as important, however, is the current on-going development of superconductors that operate above cryogenic temperatures, yet still need effective insulation. Since cryopumping does not occur at higher temperatures, the ultra-thin CVI insulation of this invention may be the only currently available practical alternative.

Benefits of the relatively lighter weight of the embodiments of the present invention over prior art insulating materials and techniques include: lighter-weight, less-expensive machinery is required for fabrication and handling; lighter-weight fasteners are required for attachment to other structures; lighter-weight structures are required to hold the present invention; and less fuel and effort is required to transport the embodiments, fasteners, and accompanying structure, if any, to which it is attached or upon which it rests.

By way of further example, existing and prospective insulation products are compared to an embodiment of the present (CVI) invention in the following table:

| APPROXIMATE VALUES FOR PROTOTYPICAL 17 CUBIC FOOT REFRIGERATOR/FREEZER | | | | |
|---|---|---|---|---|
| Type of Insulation (R per inch) | lbs/ft$^3$ | lbs/R15/ft$^2$ | Weight (lb) of R15 Insulation | Volume (ft$^3$) of R15 Insulation |
| Loose-fill fiberglass (R3) | 2 | 0.83 | 35.3 | 17.50 |
| Polyurethane foam (R7) | 2 | 0.35 | 14.9 | 7.70 |
| Perlite powder (in atm. R2.5) | 14 | 7.00 | 297.5 | 21.30 |
| Optimized mixed powder (at 0.1 mm Hg, R20) | 15 | 0.97 | 41.2 | 21.30 |
| CVI (at $10^{-6}$ torr) | N/A | 0.60 | 24.0 | 0.35 |

Another advantage of the advanced insulation according to this invention is provided by the growing body of evidence that a chemical constituent of the best low-cost insulations currently available, i.e., the expanded polymer foams, is damaging the earth's protective ozone layer. The (CFC) used to "Blow" (or expand) the foam escapes from the foam over time, gradually rising to the stratosphere where, over a 50-year life, it acts as a catalyst in the destruction of 50,000 times its weight of ozone.

Besides the present invention being a direct substitute in many applications for CRC-blown insulating foams, its other attributes of light weight, compactness, non-flammability, non-toxicity, low-cost, etc., make it beneficial to increase the R-values presently utilized in appliances and other applications, as well as those now being proposed. In the many cases where the thermal envelope is enclosing spaces of products chilled by standard vapor-compression equipment with CFC working fluid, or refrigerant, the present invention allows for a downsizing of the vapor compression equipment, and a resulting reduction in the amount of CFC refrigerant, as well as energy, needed to achieve and maintain the desired cool or chilled temperatures in the enclosed spaces. With the reduction o in compression equipment combined with replacement of CFCS-emitting materials with CVI as insulation, refrigeration equipment and other CFC insulation methods can be eliminated as a major source of CFC pollution.

A further advantage of the embodiments of this invention having corrugated designs is to enhance the ability to bend the CVI in the direction normal to the direction of the corrugated ribs as shown in FIGS. 16 and 17 and described above. This corrugated configuration allows easy forming of the insulation panel around cylindrical tanks. The corrugation also reduces contact with a rigid, non-corrugated exterior or interior surface to essentially a number of line contacts, which further thermally isolates the object being insulated. In the case of insulated piping or ducting, such corrugated insulation panels will allow bending of the piping or ducting while maintaining a very strong "hoop strength" design against collapse.

Another application for the ultra-thin compact vacuum insulation is related to the recent improvements in glazings. From an R-value of about 1 for single glazing, and about 2 for standard double glazing, designs and prototypes have appeared within the last 5 years for advanced glazings with R-values of 3 to 10. One result of these advances is that more attention has been focused on the window frame itself, which can account for as much as 30% of the total fenestration "rough opening" in a building envelope, yet is often essentially a cold short between the interior and the exterior of the building. Wood and vinyl-clad wood frames are modest improvements, with maximum total R-values approaching 5. However, considering the effect of the window frames on R-value integrated over the entire fenestration area, much more improvement would be beneficial. The ultra-thin compact vacuum insulation panel window frame coverings or caps 142, 242 shown in FIG. 25 and 342, 442 shown in FIG. 26 and described above can achieve R30 insulation values when installed on both the interior and exterior sides of the window frame, and R15 when installed on only one side with as little as 0.1 inch (2.5 mm) panel thickness.

The table below compares the effects of frames of different R-values on the integrated R-value of the fenestration opening.

| Integrated R-values for 10 ft$^2$ Window | | | | | | |
|---|---|---|---|---|---|---|
| Glazing R-Value (70% Coverage) | Frame R-value (30% Coverage) | | | | | |
| | 1 | 2 | 4 | 8 | 16 | 32 |
| 1 | 1.0 | 1.2 | 1.3 | 1.4 | 1.4 | 1.4 |
| 2 | 1.5 | 2.0 | 2.4 | 2.6 | 2.7 | 2.8 |
| 4 | 2.1 | 3.1 | 4.0 | 4.7 | 5.2 | 5.4 |
| 8 | 2.6 | 4.3 | 6.3 | 8.0 | 9.7 | 10.6 |
| 16 | 2.9 | 5.2 | 8.5 | 12.5 | 16.0 | 19.6 |

The foregoing description is considered as illustrative only of the principles of the invention. Further, since numerous modifications and changes will readily occur to those skilled in the art, it is not desired to limit the invention to the exact construction and processes shown as described above. Accordingly, all suitable modifications and equivalents may be resorted to falling within the scope of the invention as defined by the claims which follow.

The embodiments of the invention in which an exclusive property of privilege is claimed are defined as follows:

1. Thermal insulating apparatus, comprising:

a plurality of thermal insulating panels, each of which has two closely spaced-apart metallic wall panels with spacers therebetween bridging the two wall panels, such spacers being shaped such that thermal conduction through the spacer sheets must be through near "point" contacts of solid materials, the edges of said wall panels being welded together to form a chamber therebetween, and said chamber being evacuated to a high-grade vacuum having a pressure at least as low as $10^{-5}$ Torr;

a large, conventional-type insulation substrate having said thermal insulating panels attached thereto in at least two layers in such a manner that a layer of foam-type insulating intercedes between the layers of thermal insulating panels as well as between adjacent ones of said thermal insulating panels in each layer, and wherein said insulating panels in one of said layers are staggered with respect to the insulating panels in adjacent ones of said layers such that heat conducted through said substrate must travel in a tortuous path through the foam-type insulation between adjacent layers and between said insulating panels in said layers.

2. Composite thermal insulation, comprising:

a first plurality of thin, evacuated insulation panels with peripheral edges positioned in adjacent, but spaced-apart relation to, each other in a substantially common first planar alignment with a spaced distance between respective peripheral edges of adjacent ones of said evacuated panels in said first planar alignment;

a second plurality of thin, evacuated insulation panels with peripheral edges positioned in adjacent, but spaced-apart relation to, each other in a substantially common second planar alignment with a spaced distance between respective peripheral edges of adjacent ones of said evacuated panels in said second planar alignment, said second planar alignment being positioned adjacent, but in substantially parallel, spaced-apart relation to, said first parallel alignment such that there is a spaced distance between said first and second planar alignments, and the panels in said first planar alignment being staggered with respect to the panels in said second planar alignment such that at least one of said panels intersects any line that is perpendicular to said first and second planar alignments; and a mass of different thermal insulation material substantially filling said spaced distances between said respective peripheral edges as well as substantially filling said spaced distance between said first and second planar alignments.

3. The composite thermal insulation of claim 2, wherein said different insulation material is a foam insulation material.

4. The composite thermal insulation of claim 2, wherein said different insulation material is a powder insulation material.

* * * * *